United States Patent [19]

Hawthorne

[11] Patent Number: 4,807,565

[45] Date of Patent: Feb. 28, 1989

[54] GRAVITY FILTER SYSTEM AQUARIUM

[76] Inventor: Mark A. Hawthorne, 3341 Kensington, Kansas City, Mo. 64128

[21] Appl. No.: 82,384

[22] Filed: Aug. 6, 1987

[51] Int. Cl.$^4$ .............................................. A01K 63/00
[52] U.S. Cl. ......................................................... 119/5
[58] Field of Search ............................ 119/2, 3, 4, 5

[56] References Cited

U.S. PATENT DOCUMENTS

| | | | |
|---|---|---|---|
| 2,776,642 | 1/1957 | Sepersky | 119/5 |
| 3,591,971 | 7/1971 | Tanner | 119/5 |
| 3,721,212 | 3/1973 | Groth | 119/5 |
| 3,892,199 | 7/1975 | Huyler | 119/5 |
| 3,983,843 | 10/1976 | Johnson | 119/5 |
| 4,151,810 | 5/1979 | Wiggins | 119/5 |
| 4,537,149 | 8/1985 | Ryan | 119/4 |

*Primary Examiner*—Gene Mancene
*Assistant Examiner*—R. Thomas Price

[57] ABSTRACT

An aquarium system consist of an open topped fish tank, a base cabinet stand and an encased cover, wherein unclarified aquarium water is drawn downwards by gravity and filtered below the tank, while being aerated and heated as it is returned to the tank in a waterfall fashion.

The tank includes removable gravel support grating trays, a funnelform bottom and a drain.

The stand houses a main shut-off valve, a clean out trap, a filter tank with a removable cap and fiber housing, along with a holding tank and water pump.

The cover encasement houses a light, an aerator, a water compartment and guide tray, as well as a programmable timer to control the on/off functions of the water pump.

In operation, unclarified water in the tank is drawn downwards by gravity and is filtered once as it passes into the drain, and again in the filter tank, before being pumped into the water compartment.

In the water compartment, the newly filtered water is accumulated until it flows downwards along the guide tray, creating a waterfall effect, while being aerated and heated as it passes back into the tank.

This entire system is controlled by a programmable timer, which enables the filtering process to be repeated at predetermined intervals daily.

24 Claims, 16 Drawing Sheets

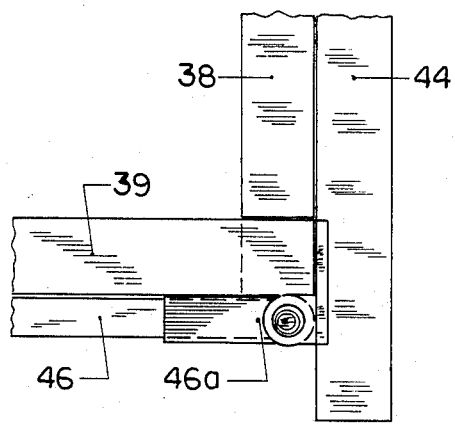
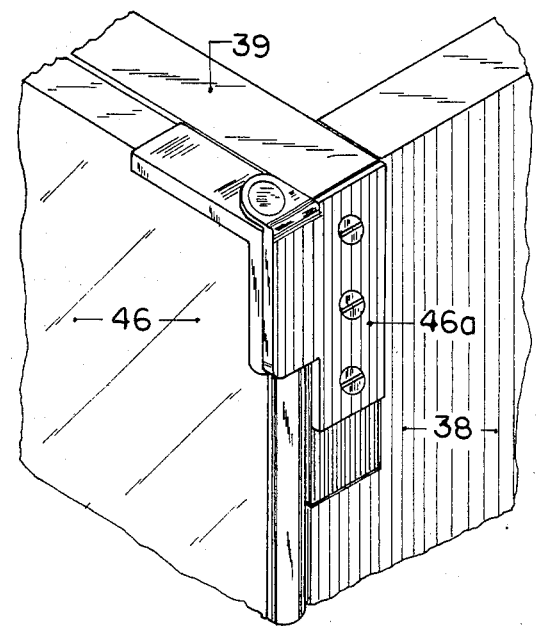
FIG. 17         FIG. 18
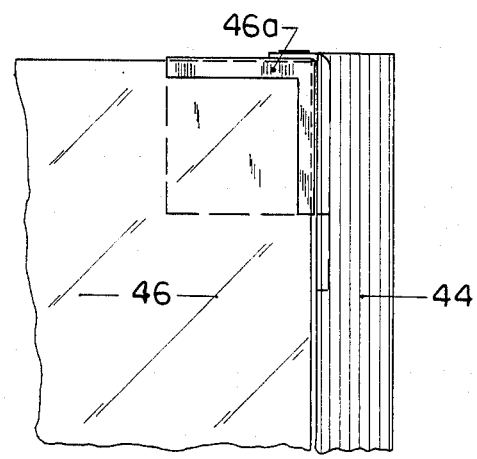
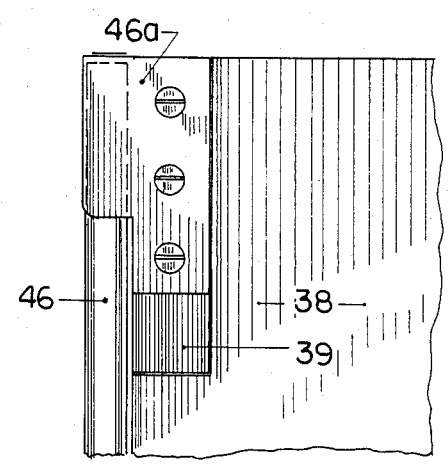
FIG. 19         FIG. 20

GRAVITY FILTER SYSTEM AQUARIUM

BACKGROUND OF THE INVENTION

This invention relates generally to aquariums and more particularly to an aquarium system that is comprised of a fish tank, a stand and an encased cover, wherein unclarified water is drawn downwards by gravity and filtered below the tank before being pumped upwards into the encased cover, where it is aerated and heated while being returned to the tank in a waterfall fashion and whereby the entire system is regulated by a programmable timer.

An aquarium is an artificial environment that contains a limited volume of water used to sustain fish and aquatic plant life, therefore, it is necessary to fully regulate and maintain a balanced, pollutant free environment therein. To accomplish this, the periodic filtration of aquarium water is necessary to remove organic waste and other impurities that accumulate in the gravel at the bottom of the tank.

One of the most commonly used methods of filtration is that of the undergravel filtering unit, as in Sesholtz, U.S. Pat. No. 3,516,544, where perforated grating is placed on the bottom of the tank beneath the gravel, with plastic suction units mounted at each end. This filtering unit is made operative when air from a separate aerator unit is pumped through one tube of each suction unit, causing water to be forced upwards through the other tube. This action creates a suction beneath the gravel, causing unclarified water to be drawn downwards through the gravel, where organic waste and other impurities remain trapped therein.

Another common method of filteration, is that of the power filter unit, which is usually mounted on the side of the tank and is sometimes used in conjunction with an undergravel filter unit.

With this unit, unclarified water is pumped from beneath the gravel into a water compartment housed within a filter unit, where it is circulated through filter medium before being returned to the tank.

These methods are adequate, however, they are required to function constantly in order to achieve their purpose and will usually require frequent cleaning and changing of the filter medium.

Furthermore, due to the failure of these methods to effectively breakdown and remove organic waste and other impurities trapped in the gravel at the bottom of the tank, the time consuming task of cleaning the entire tank is necessary.

In order to maintain aquatic life within an aquarium, some form of aeration and lumination, along with the introduction of heat into the tank is also necessary.

The most common method of aeration is that provided by an electric aerator, that forces air through plastic tubing and discharges it in the form of bubbles inside the tank.

The most common method of supplying light for an aquarium is usually that of a fluorescent light unit mounted inside the cover of the tank.

The most common method of heating aquarium water is that provided by an edge mounted electric heater, whose heating element, housed in protective glass, is projected down into the tank, where it slowly raises the water temperature.

These units are effective, however, they lack the ability to maintain a balanced environment created by evenly distributing oxygen, light and heat throughout the entire tank.

Usually, the filter, aerator, light and heater are separate units made to be mounted on the side, back or top of the tank. However, advances have been made to incorporate some, or all of these units into one housing, as in Huyler, U.S. Pat. No. 3,892,199.

In this unit, unclarified water is pumped upwards, preferrably at a rate of 180 to 210 gallons per hour, from an undergravel filter unit located inside the tank, into a main housing, where it is filtered and heated before being aerated while spilling back into the tank.

This unit improved on most of the problems associated with previous units, however, this unit is also required to function constantly in order to achieve its purpose and will require frequent cleaning.

Furthermore, even at a high rate of circulation, this unit could not prevent the eventual build-up of organic waste and other impurities in the gravel at the bottom of the tank, therefore, the time consuming task of cleaning the entire tank, continued to be necessary.

The present invention overcomes problems associated with previous units and complements the use of a fluorescent light unit as well as an electric aerator unit.

This system also supplies a means by which to regulate its unique below-the-tank gravity filter system, which will virtually eliminate the time consuming task of cleaning the entire tank.

SUMMARY OF THE INVENTION

In accordance with the present invention, an improved aquarium system consist of an open topped fish tank, a base cabinet stand and an encased cover, wherein unclarified aquarium water is drawn downwards by gravity and filtered before being aerated and heated while creating a waterfall effect as it is returned to the tank. Furthermore, this entire system is regulated by a programmable timer.

One unique feature of this aquarium system is its attractive design. This system, unlike most aquarium systems includes a stand, a tank and a cover, that when assembled, form a continuous vertical tower of tinted glass and prefinished particle board.

With the interior light off, this systems tinted glass retains reflective qualities that disguise its true function. Another unique feature of this invention is its below-the-tank gravity filtering process, wherein unclarified water inside the tank is drawn downwards by gravity and strained through a bed of gravel supported by two removable grating trays.

Water is then guided by a funnelform bottom inside the tank, into a trench filled with granulated charcoal, where it is filtered before passing into a drain located at the center of the trench.

Once in the drain, the water passes through a main shut-off valve and a clean out trap into a filter tank, which contains a removable fiber housing.

After being filtered by these fibers, the water flows downwards into a holding tank, where it will be pumped at a rate of 85 to 110 gallons per hour, into an upper water compartment housed within the encased cover.

In the upper water compartment, the filtered water will be accumulated until it flows downwards over a guide tray creating a waterfall effect, while being aerated and heated as it is returned to the tank.

This filtering system will virtually eliminate the time consuming task of cleaning the entire tank, by filtering aquarium water just below the gravel where organic waste and other impurities accumulate.

The most unique feature of this invention is its programmable timer, housed within the right side of the cover encasement.

This unit can be programmed to perform up to four on/off functions daily and is used to control the water pump housed within the stand, thereby regulating the entire filtering system.

The cover encasement also contains an electric aerator that provides a means of constant aeration and a fluorescent aquarium light that provides limination for the tank as well as the waterfall.

A starter switch for the fluorescent light is located on the right side of the cover encasement, along with a control panel for the programmable timer and a pump activator switch, which are connected to the water pump by an insulated cable.

This aquarium system, for descriptive and illustrative purposes, but not those of limitation, will hereinafter be described in the the form of three preferred embodiments.

BRIEF DESCRIPTION OF DRAWINGS

FIG. 1 is a three dimensional view of the present invention shown with the interior light on.

FIG. 17 is a fragmentary top view of the front right corner of the third embodiment.

FIG. 18 is a three dimensional view of the top side hinge connection of the third embodiment.

FIG. 19 is a fragmentary front view of the top side hinge connection of the third embodiment.

FIG. 20 is a fragmentary side view of the top side hinge connection of the third embodiment.

DETAILED DESCRIPTION OF PREFERRED EMBODIMENTS

Figure 1:
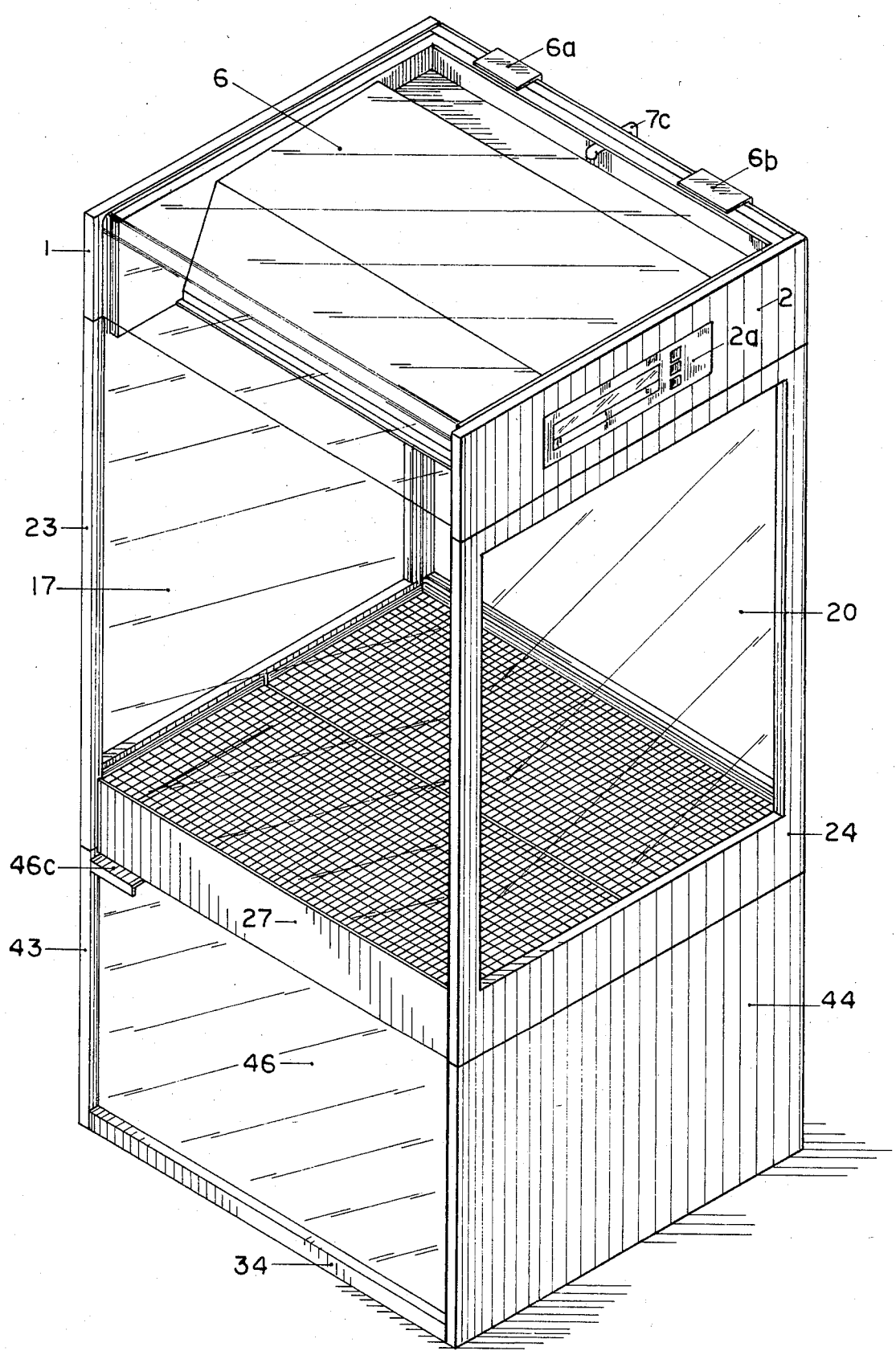

The present invention, shown in FIG. 1, will now be described in detail, in the form of three preferred embodiments. The first embodiment is the encased cover, the second embodiment is the fish tank and the third embodiment is the base cabinet stand.

EMBODIMENT I

The first embodiment, which is the encased cover, (shown in FIGS. 2, 3 and 4), being 17½ inches long, 19 inches wide and 4½ inches high, is composed of two rectangular shaped, prefinished particle board side walls (1 and 2), a rectangular shaped prefinished particle board upper back wall (3), a molded plastic lower back panel [4], a flat plastic bottom (5) and an "L" shaped tinted glass or plexiglas top (6) with hinges (6a and 6b).

Figure 2:
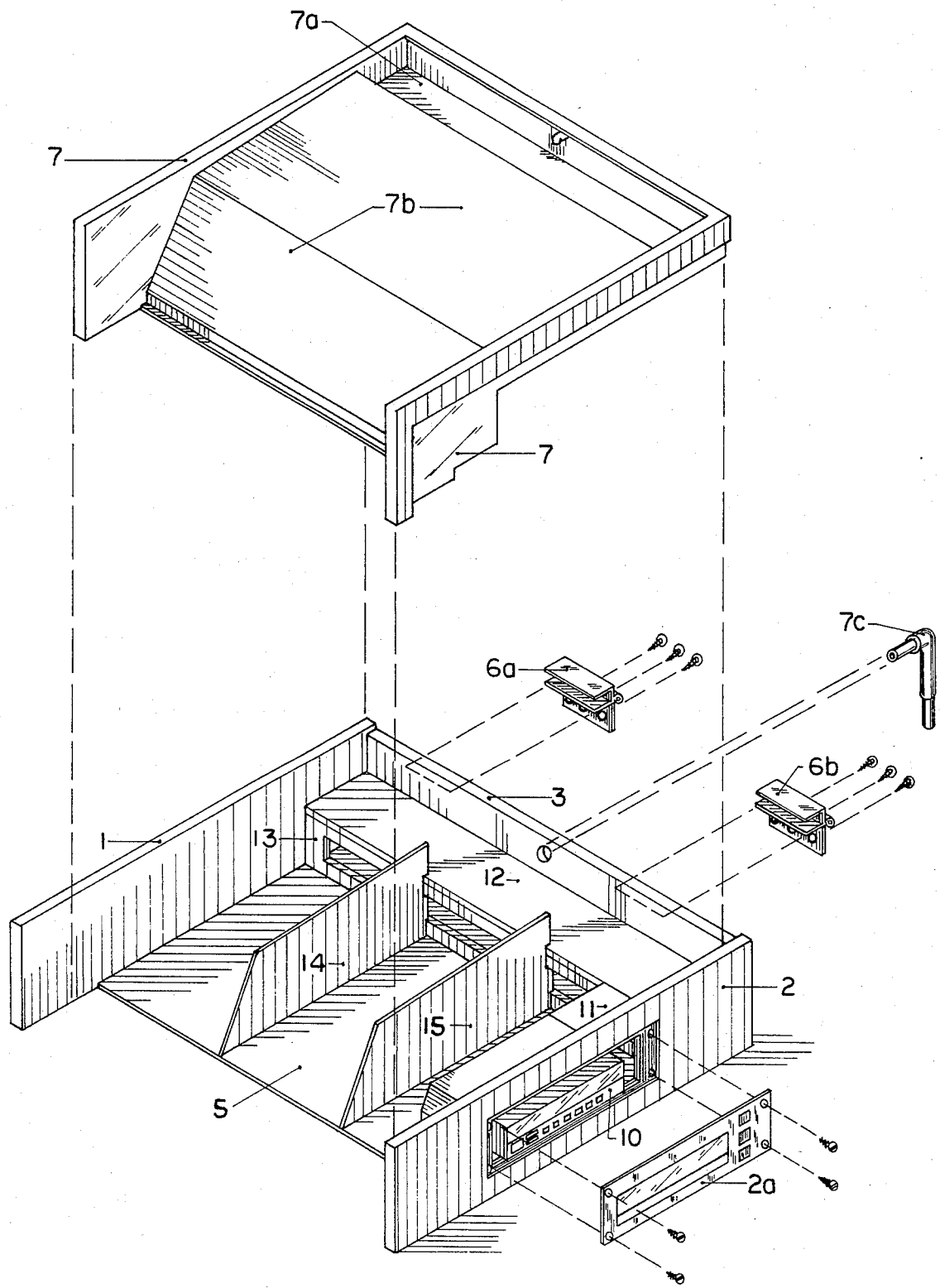
FIG. 2 is a three dimensional assembly of the first embodiment, shown with the lift-up top removed.
Figure 6:
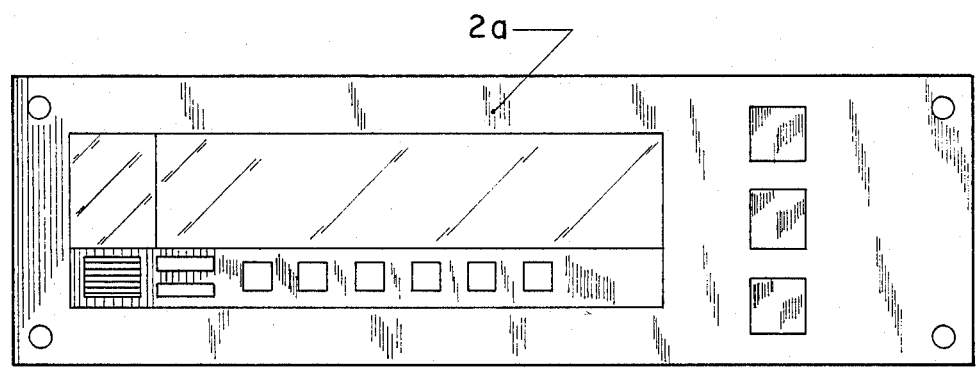
FIG. 6 is an elevational view of the control panel in the first embodiment.

As shown in FIG. 2, the two side walls (1 and 2) of the cover encasement, being positioned on each side of the upper back wall (3), are situated so that their shorter edges extend vertically between their longer horizontal edges. The wall situated on the right side of the encasement (2), will contain the control panel (2a) shown in FIG. 6.

The shorter edges of the upper back wall [3]. are cemented in ¼ inch deep grooves located at the upper interior edges of the side walls (1 and 2), forming a 90 degree angle at each end.

Figure 5:
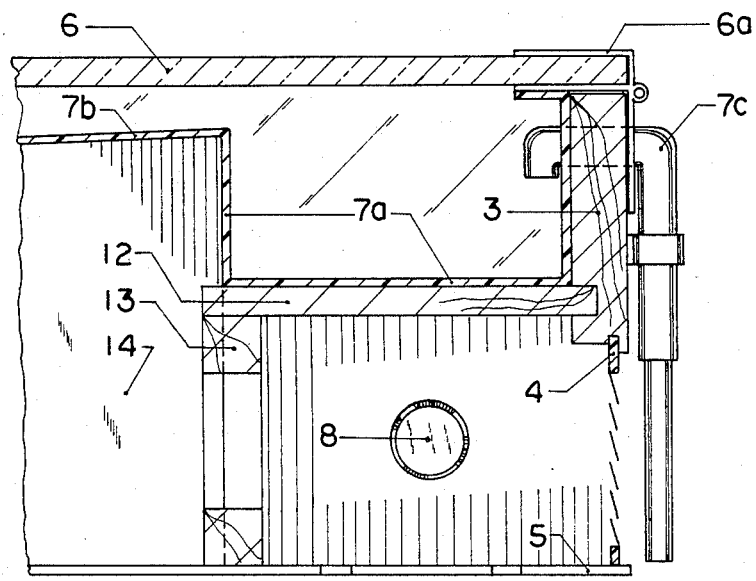
FIG. 5 is a fragmentary sectional view of the first embodiment taken along lines 5—5 of FIG. 3.

The lower portion of the back wall (3), as shown in FIG. 5, consist of a removable plastic panel (4), which contains narrow horizontal openings, to allow ventilation of the fish tank below.

Figure 4:
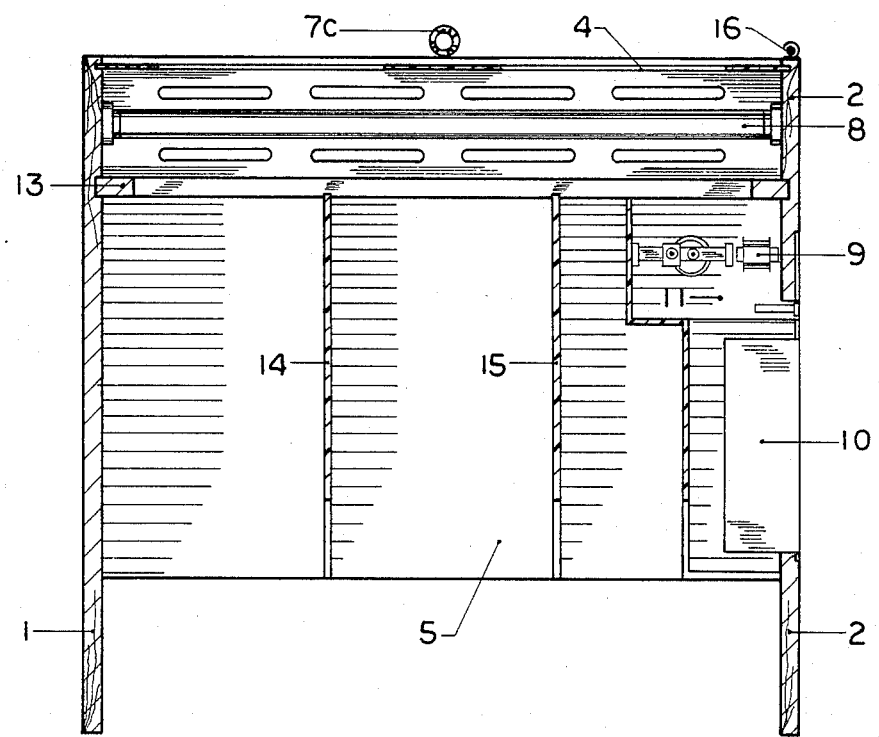
FIG. 4 is a sectional plan view of the first embodiment cut along the center.

In FIG. 4 the flat translucent bottom of the cover encasement (5), is anchored in depressions along the bottom edges of the side walls (1 and 2) and spans three quarters of the distance from the lower back wall panel (4), to the front side of the outer encasement. The area beyond the front edge of (5), the flat bottom, will remain open as a means by which to gain access to the fish tank below. The rear portion of the flat translucent bottom (5), shown in FIG. 4, contains narrow horizontal openings to allow ventilation of the fish tank below.

The lift-up top (6), composed of tinted transparent glass or plexiglas, as shown in FIG. 1, is formed with a 90 degree bend, at a distance from the front edge which is equal to the vertical height of the side walls (1 and 2).

This "L" shaped tinted glass or plexiglas top (6), contains thumb lifts and is hinged to the top portion of the upper back wall (3) along its read edge by hinges (6a and 6b), allowing it to be lifted upwards from the front side.

The encased cover houses a water compartment and guide tray assembly (7), a fluorescent light unit (8), an aerator (9), a programmable timer (10) and an electrical switch box (11).

Figure 3:
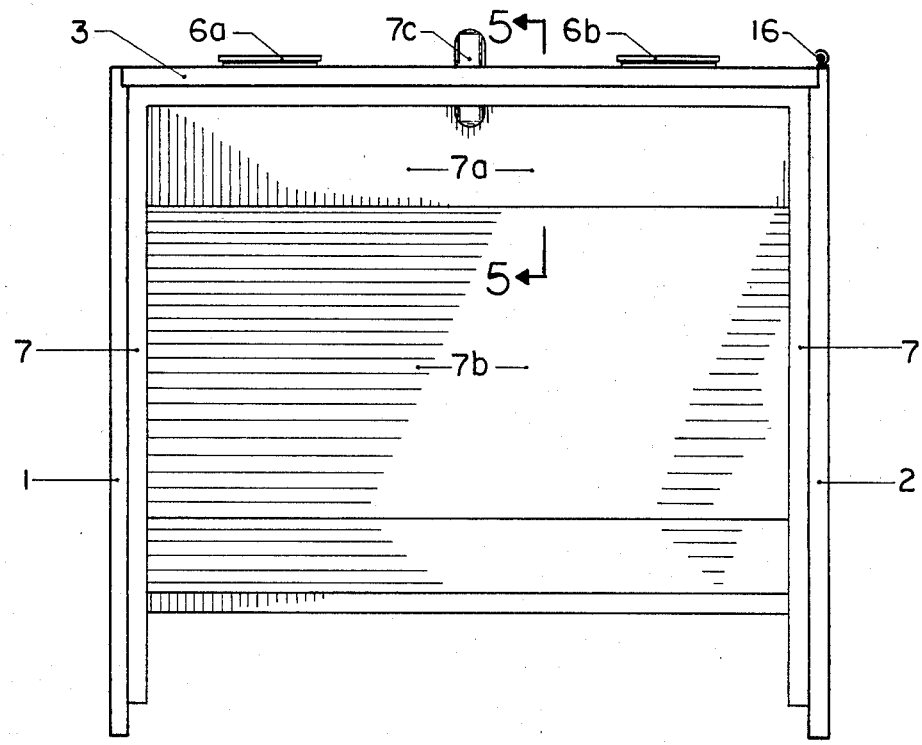
FIG. 3 is a plan view of the first embodiment, shown with the lift-up top removed.

The water compartment and guide tray assembly (7), shown in FIG. 2, is formed of molded plastic and fits tightly inside the outer walls (1, 2 and 3) of the cover encasement as shown in FIG. 3.

The water compartment (7a), forms the upper portion of the assembly and is comprised of a back wall, a front wall and two translucent side walls, all of which extend vertically from a flat bottom, forming a water tight rectangular shaped containment therein.

The back wall of the water compartment is formed with a ½ inch wide rim along its top edge and contains an intake pipe (7c), that extends through an opening in the upper back wall (3) of the outer encasement.

The front wall of the water compartment has a top elevation that is ¼ inch below that of the back and side walls, thereby forming the upper edge of the guide tray.

The guide tray (7b), comprising the lower portion of the assembly, is bent horizontally at two points, forming three increasingly accelerative slopes. The guide tray (7b), is bonded and sealed water tight along the vertex of the second bend, to the front edge of the cover encasements flat bottom (5), where it extends downwards ½ inch before forming a thin splash plate along its lower edge.

The water compartment and guide tray assembly (7), is bordered, by two translucent side walls, which are anchored to the side walls (1 and 2) of the cover encasement as shown in FIG. 3.

These walls, are formed with a ½ inch wide rim along their top edges, which span along the interior side of the tinted glass top (6), from the back wall of the water compartment (7a), to the interior front edge of the cover encasement.

This entire assembly (7) is supported by interior panels (12, 13, 14 and 15), shown in FIG. 2, that span from side to side below the bottom of the water compartment (7a) and from the upper back edge of the guide tray (7b), to the lower front edge of the flat bottom (5).

In FIG. 2, the interior supports (12 and 13), below the bottom of the water compartment (7a), are composed of two rectangular shaped sections of particle board.

The horizontal panel (12) is formed of solid particle board and the vertical panel (13) is a frame formed with strips of particle board.

These panels are cemented in ¼ inch deep grooves in the rear interior edges of the upper back (3) and outer side walls (1 and 2), forming a rectangular chamber along the lower back panel (4) of the back wall.

The interior supports below the guide tray (14 and 15) are composed of plastic panels, which are cemented to th flat bottom (5) of the encasement as well as to the bottom of the guide tray (7b).

These panels (14 and 15), which conform to the sloping angles of the guide tray (7b), are positioned in the interior, forming three equally spaced compartments therein.

The fluorescent light unit (8) shown in FIG.4, (made by The General Electric Company), consist of an 18 inch long, 15 watt aquarium and plant lamp, a starter switch and a ballast. This unit (8) provides lumination for the fish tank, as well as the encased cover.

The fluorescent lamp assembly has been adapted to span between the two side walls (1 and 2) of the rectangular chamber below the water compartment (7a) and is connected to the starter switch in the control panel (2a), which is located in the right side wall (2) of the cover encasement. The ballast of this unit is located in the AC power cord, which extends through the lower back panel (4) of the outer encasement.

The aerator unit (9) shown in FIG. 4, (made by Metaframe of East Paterson, N.J.), is powered by a 115 Volts A.C. 60 Mz 3 watt motor, mounted to the right interior wall (2) of the encasement.

This unit (9) has been adapted to pump air through a port that penetrates the flat bottom (5) of the encasement and connects to plastic tubing inside the fish tank below.

The programmable timer (10) shown in FIG. 4, located behind the control panel (2a) on the right side wall (2) of the cover encasement, (made by The General Electric Co.), is comprised of a digital clock display, a timer control panel and a control unit.

This timer (10) can be programed to initiate up to four on/off functions daily and has been adapted to regulate the on/off functions of the water pump (52) housed within the base cabinet stand.

The electrical switch box (11) shown in FIG. 4, composed of durable molded plastic, is mounted to the right interior side wall (2) of the encasement and contains all power and control wiring, as well as all activator switches for the fluorescent light unit (8), the aerator (9) and the programmable timer (10).

The switch box (11) also contains an insulated electrical cable (16), that extends through the lower back panel (4) of the outer encasement and contains the power and control wiring of the programmable timer (10).

For assembly purposes, the bottom side edges of the encased cover contain two ¼ inch diameter by ½ inch deep holes, which are centered 3 inches from the front and back edges of each side well.

EMBODIMENT II

The second embodiment, which is the fish tank, (shown in FIGS. 7,8,9 and 10), being 17½ inches long, 19 inches wide and 22¾ inches tall, is comprised of a vertical tinted glass enclosure and a funnelform bottom structure (21), contained in a prefinished particle board casing.

Figure 7:
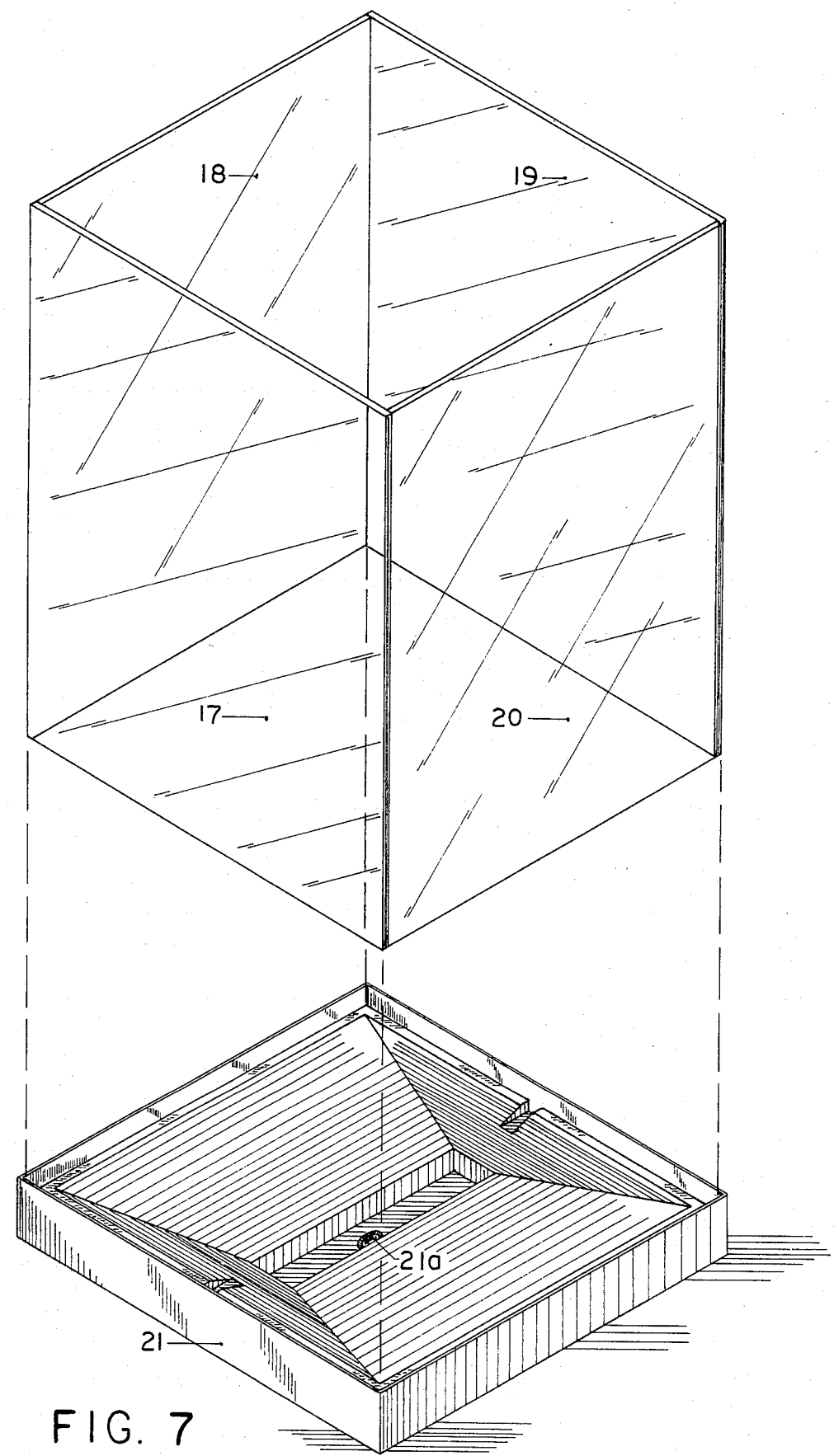
FIG. 7 is a three dimensional assembly view of the second embodiment.

The tinted glass enclosure shown in FIG. 7, is composed of four ¼ inch thick rectangular shaped tinted glass panels (17, 18. 19 and 20), whose longer edges extend vertically between their shorter horizontal edges. These panels are bonded and sealed water tight along their adjoining side edges forming a vertical tinted glass enclosure, remaining open at the top and bottom.

Figure 11:
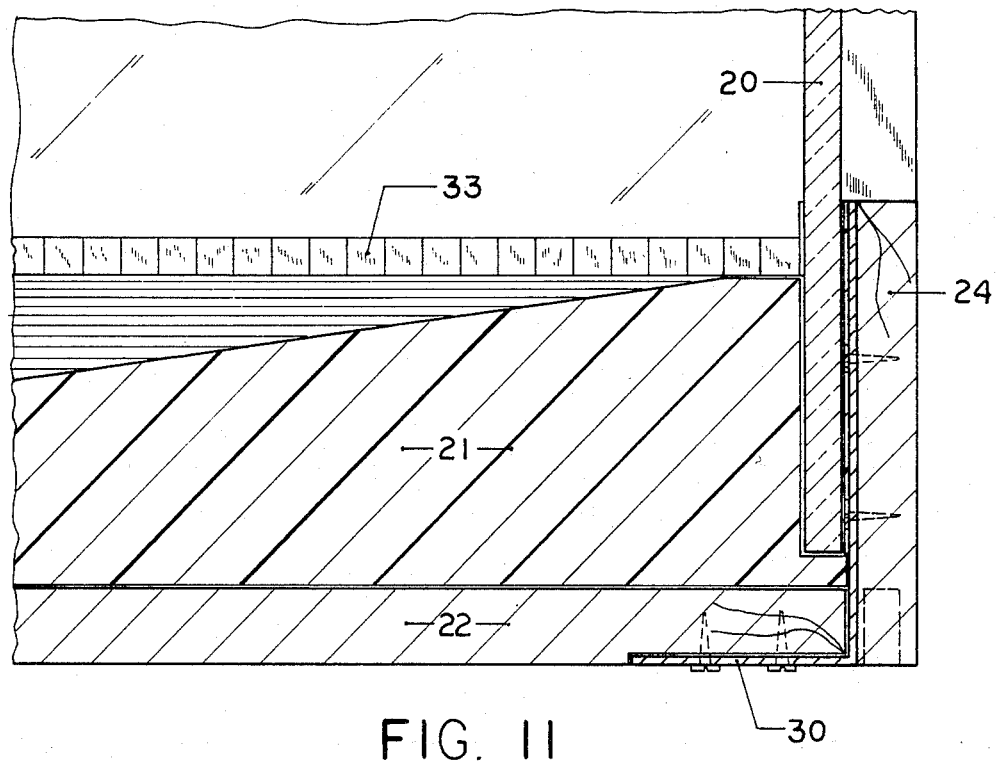
FIG. 11 is a fragmentary section of the second embodiment taken along lines 11—11 of FIG. 9.
Figure 12:
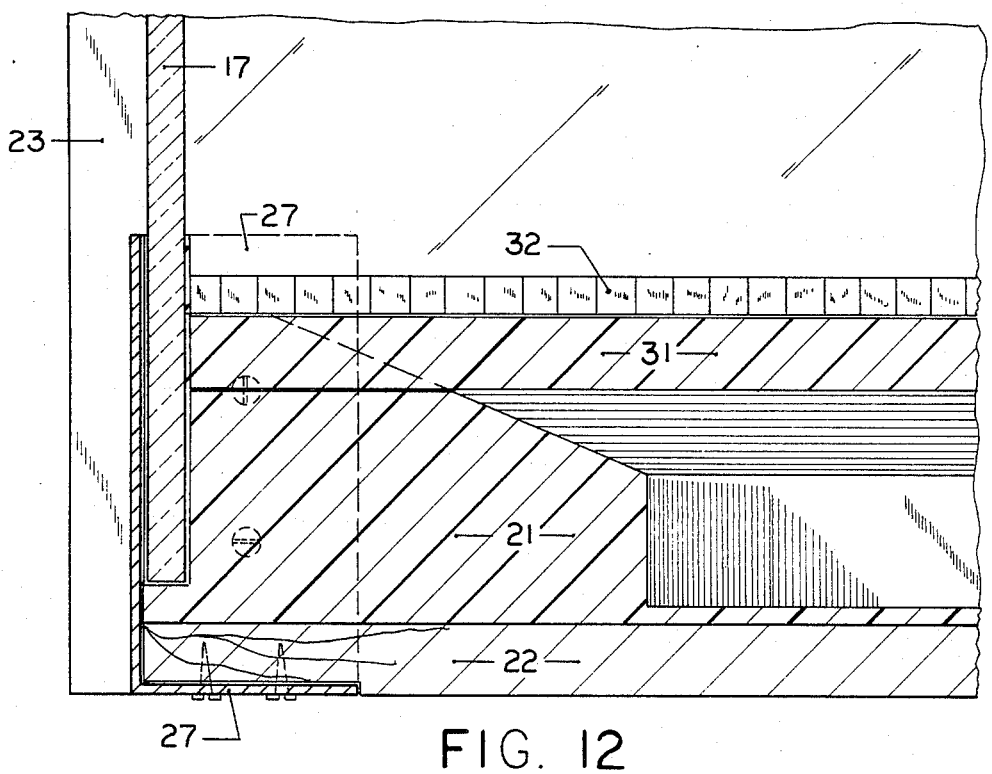
FIG. 12 is a fragmentary section of the second embodiment taken along lines 12—12 of FIG. 9.

The funnelform bottom (21), shown in FIG. 7, is composed of durable molded plastic and is formed with a ¼ inch wide by 1¾ inch deep continuous channel about its outer edge, in which to insert and seal the bottom edges of the tinted glass enclosure as shown in FIGS. 11 and 12. This bottom structure (21) is formed to slope inwards, to a centrally located trench and drain (21a).

The trench, which contains a removable wire insert, is 1 inch deep and 2 inches wide and extends between the front and back sides of the funnelform bottom (21) as shown in FIG. 7. These sides contain a ½ inch square slot at the center of their top edges in which to insert the ends of a removable center beam (31) shown in FIG. 12.

Figure 10:
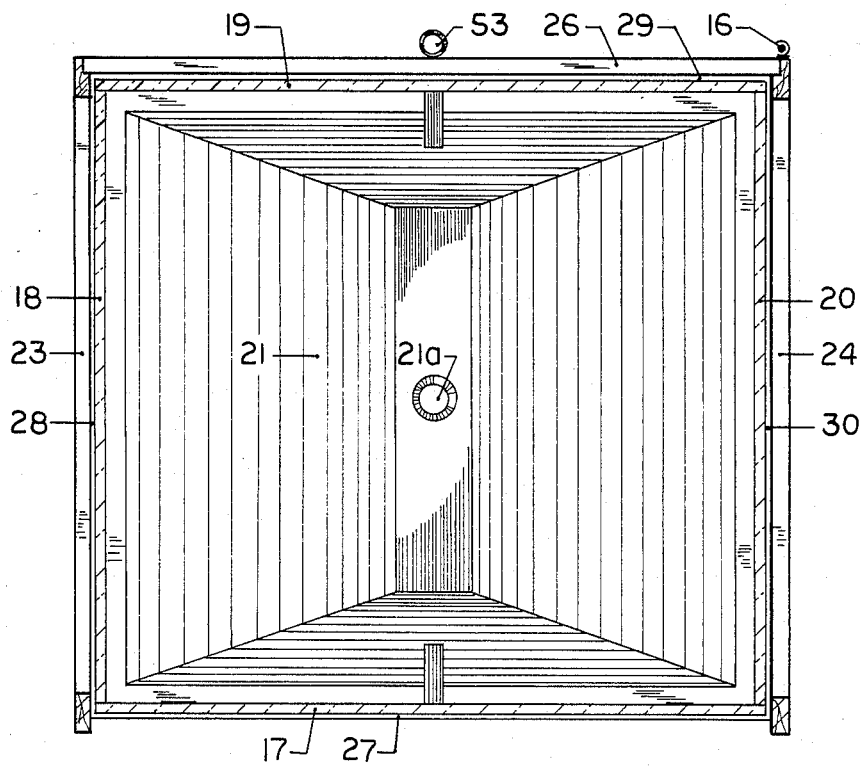
FIG. 10 is a sectional plan view of the second embodiment taken along the top of the funnelform bottom.

The drain (21a) shown in FIG. 10, located in the middle of the trench, is 2 inches long and is formed with a ¾ inch nominal socket fitting at its lower end.

Figure 8:
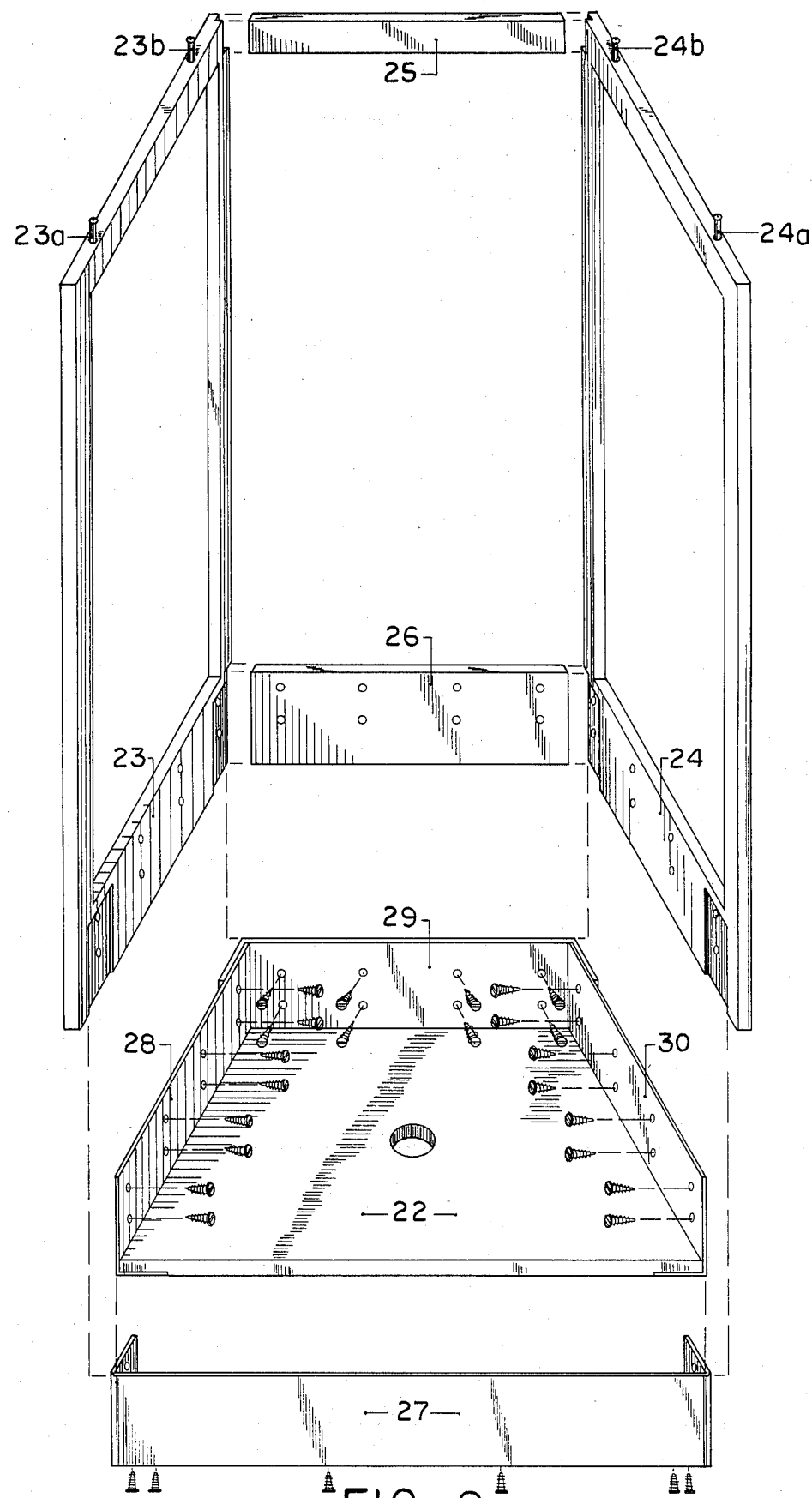
FIG. 8 is a perspective assembly view of the outer casing of the second embodiment.

The prefinished particle board casing structure, whose assembly is shown in FIG. 8, consist of a flat base (22), with two rectangular shaped framing panels (23 and 24) and two back side framing sections (25 and 26).

The flat base (22), whose outer perimeter measures the same as that of the funnelform bottom (21), has a 1 inch diameter opening in the center through which to insert the drain (21a) and is anchored to a metal frame consisting of four 3 by 1.5 by 0.05 inch angles (27, 28, 29 and 30) as shown in FIG. 8.

The shorter horizontal legs of these angles are anchored to the bottom side of the flat base (22), with ⅜ inch long wood screws and the vertical legs are positioned tightly against its outer edges.

Each framing panel (23 and 24) consist of two 1 inch wide side sections that extend vertically between a 1 inch wide top section and a 3 inch wide bottom section.

These sections form a rectangular shaped frame whose vertical height is equal to that of the combined tinted glass enclosure and funnelform bottom structure (21) shown in FIG. 7.

The bottom sections of the two framing panels (23 and 24), whose front edges extend ½ inch beyond that of the flat base (22), are anchored along their interior sides to the vertical legs of each side angle (28 and 30), as well as to the side webbing of the front and back angles (27 and 29) with ⅜ inch long wood screws.

The vertical leg of the back angle (29) is anchored to the interior side of the bottom framing section (26), with the vertical leg of the front angle (27) remaining exposed along the outer surface of the front side. The two back side framing sections (25 and 26) are rectangular in shape and extend horizontally between the top and bottom edges of the two framing panels (23 and 24).

The top section (25) is 1 inch wide and the bottom section (26) is 3 inches wide, with the shorter side edges of each being cemented in ¼ inch deep grooves in the rear interior edges of each framing panel (23 and 24) as shown in FIG. 8.

Figure 9:
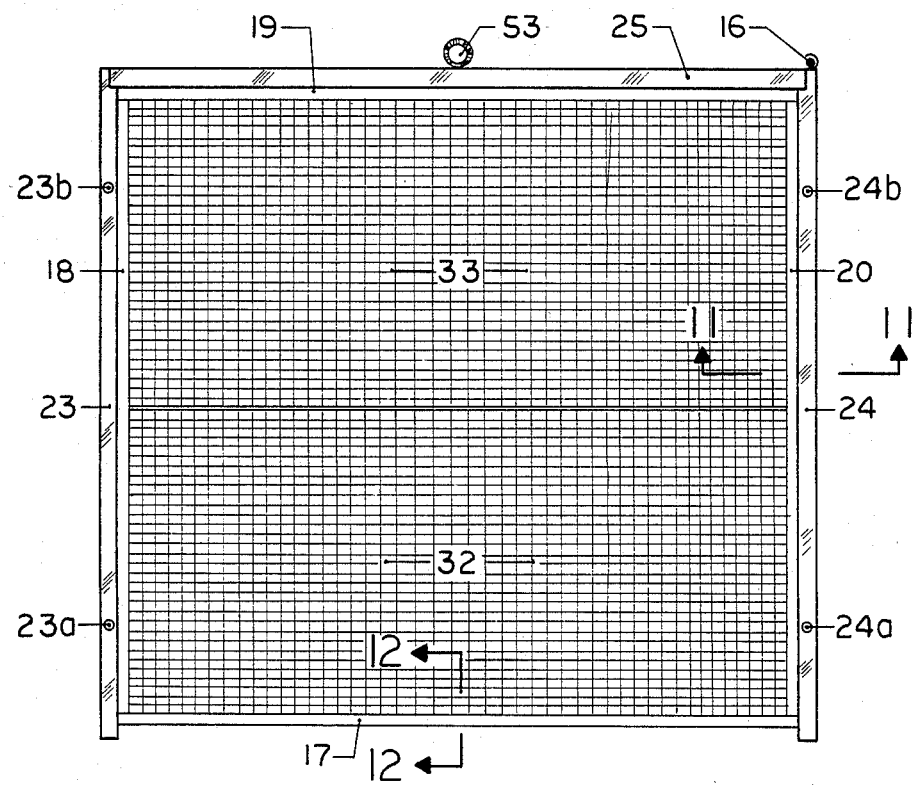
FIG. 9 is a plan view of the second embodiment.

The tinted glass enclosure along with the funnelform bottom structure (21), are contained within the prefinished particle board casing structure, as shown in FIGS. 9 and 10, forming a rectangular shaped open topped fish tank.

The fish tank contains a ½ inch thick removable center beam (31) that spans along the middle of the center trench, between the front and back interior walls of the funnelform bottom (21). This beam (31), shown in FIG. 12, as well as the top interior edges of the funnelform bottom (21), support two removable gravel support grading trays (32 and 33) shown in FIG. 9.

The grading trays, formed of durable grid pattern plastic material, are rectangular in shape, with ½ inch raised side walls about their outer edges and are capable of supporting a thin layer of course or medium grade gravel.

For assembly purposes, the top side edges of the fish tank each contain two ¼ inch diameter by 1 inch long metal pegs (23a, 23b, 24a and 24b), shown in FIGS. 8 and 9, and the bottom side edges each contain two ¼ inch by ½ inch deep holes. Both the metal pegs and the holes, are centered 3 inches from the front and back edges of each side wall (23 and 24), with the pegs being embedded ½ inch deep.

EMBODIMENT III

The third embodiment, which is the base cabinet stand, (shown in FIG. 13 thru 16), is 17½ inches long, 19 inches wide and 12¼ inches tall.

This stand is comprised of a flat base (34) and an interior beam and panel support structure, encased by two rectangular shaped prefinished particle board side walls (43 and 44), a rectangular shaped prefinished particle board back wall (45) and a rectangular shaped tinted glass door panel (46).

Figure 13:
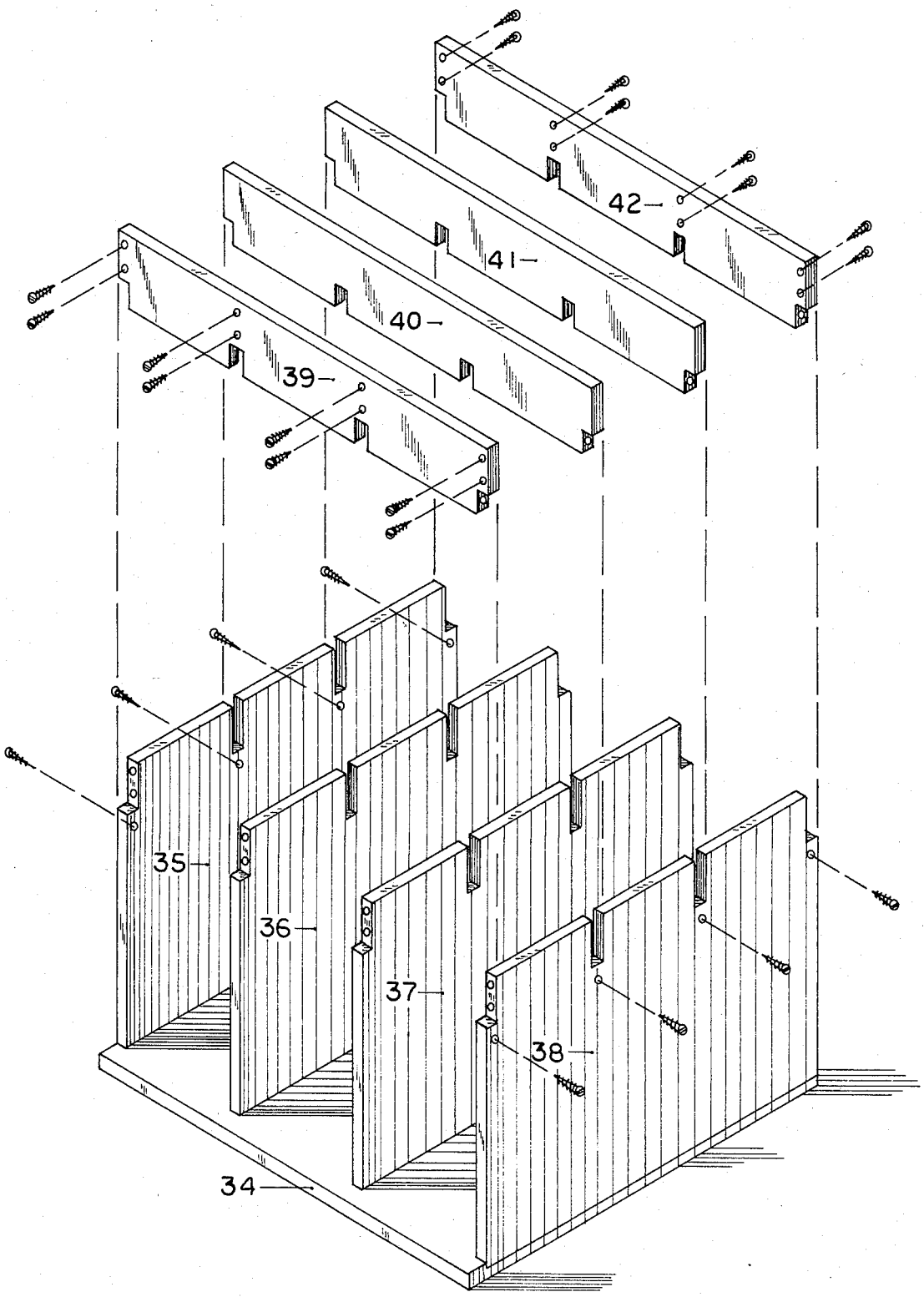
FIG. 13 is a three dimensional assembly of the interior support structure of the third embodiment.

The flat base (34) being ¾ inch thick, anchors an interior support structure composed of a network of rectangular shaped particle board beams (39, 40, 41 and 42) and panels (35, 36, 37 and 38), as shown in FIG. 13.

The shorter sides of each support panel extend vertically between their longer horizontal sides, which extend from the back edge of the flat base (34) to within ¾ inch of its front edge.

The bottom horizontal edges of each panel, are cemented in ¼ inch deep grooves cut along the top surface of the flat base (34). These panels (35, 36 and 38) contain 2 inch deep slots along their top sides, in which to insert support beams (39, 40, 41 and 42) shown in FIG. 13.

The support beams, being 3 inches high, span from side to side along the top edges of the support panels.

These beams (39, 40, 41 and 42) contain 1 inch deep slots cut along their bottom edges, which are spaced to intersect with those of the support panels (35, 36, 37 and 38), shown in FIG. 13. The front and back side support beams (39 and 42) are bolted to each support panel and the outer support panels (35 and 38) are bolted to each support beam at their points of intersection, with 1 inch long wood screws, as shown in FIG. 14.

All adjoining edges of the interior beam and panel support structure, are cemented with a particle board bonding adhesive to enhance its structural integrity.

Figure 14:
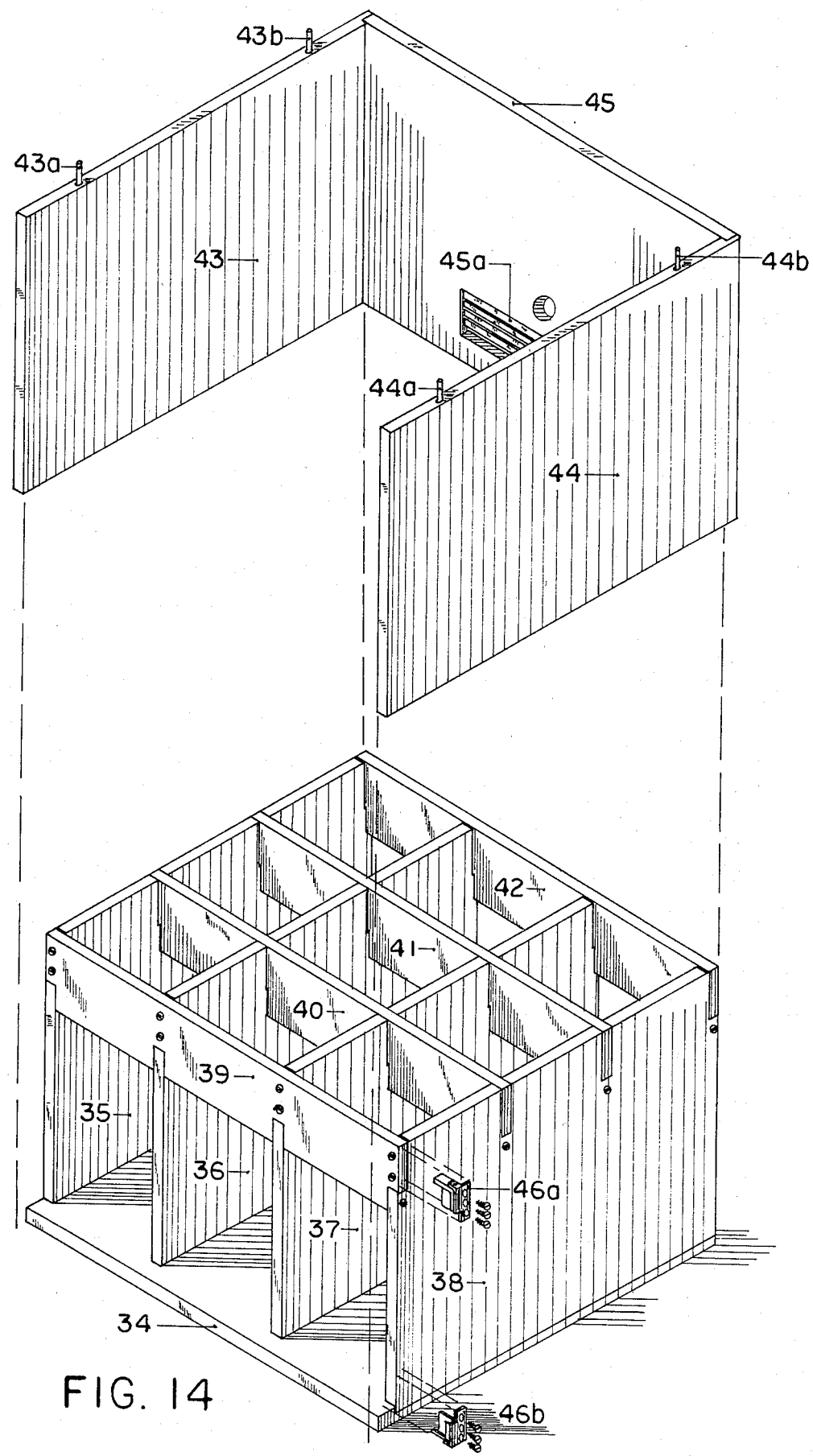
FIG. 14 is a three dimensional assembly of the interior support structure and the outer cabinet of the third embodiment.
Figure 15:
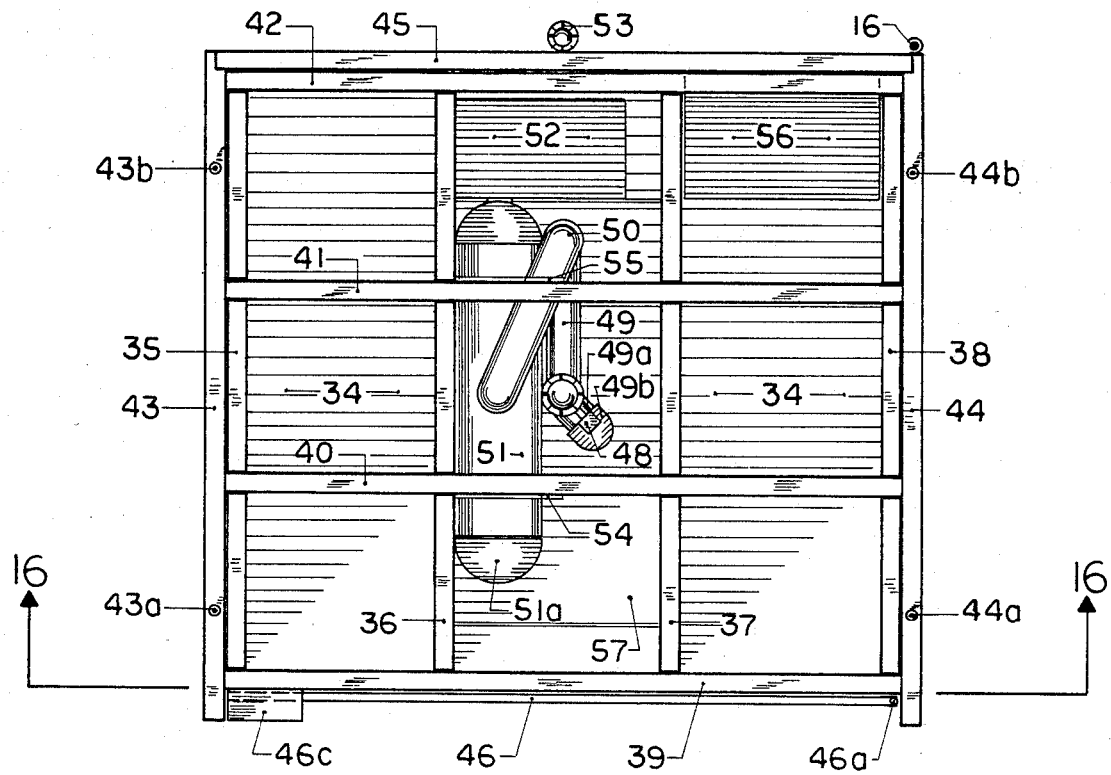
FIG. 15 is a plan view of the third embodiment.

The interior support structure is contained within a prefinished particle board cabinet, shown in FIG. 14, consisting of two side walls (43 and 44), a back wall (45) and a tinted glass door panel (46) shown in FIG. 15.

The two side walls (43 and 44) of the base cabinet stand, are positioned with their shorter sides extending vertically between their longer horizontal sides.

The back wall (45), whose shorter side edges are cemented in ¼ inch deep grooves along the rear interior edges of the two side walls (43 and 44), contains two rectangular shaped openings along its bottom edge.

The opening situated along the lower right side of the back wall (45), contains the front panel of the connection box (56) and the opening along the middle of the back wall, contains a removable louver panel (45a), shown in FIG. 14.

Figure 16:
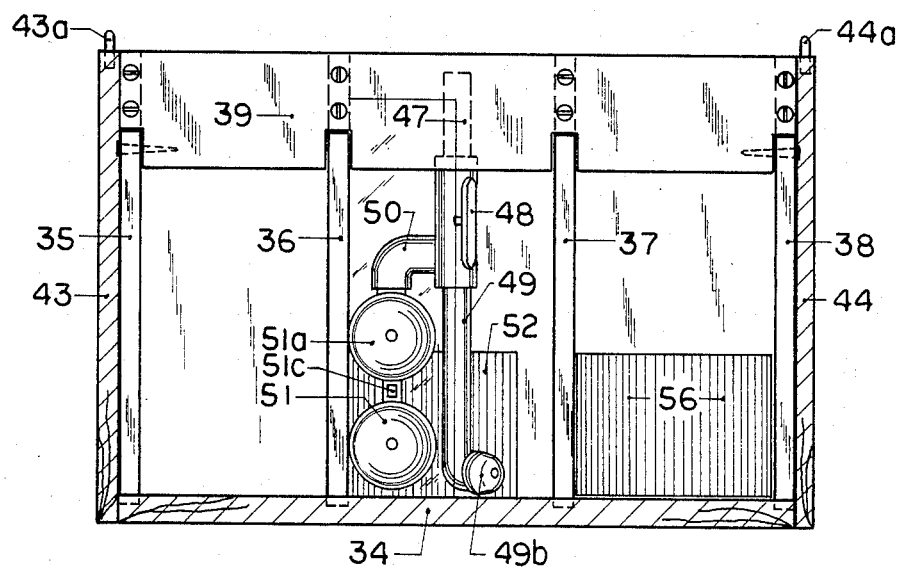
FIG. 16 is a section of the third embodiment taken along lines 16—16 of FIG. 15.

The tinted glass door panel, shown in FIG. 15, which includes a top mounted handle and catch assembly (46c), is mounted on hinges (46a (shown in FIGS. 17, 18, 19 and 20) and 46b) which are bolted to the right side of the interior support structure as shown in FIG. 14. Cabinet stand, is cemented to the outer surface of the interior support structure, as shown in FIGS. 15 and 16, comprising a stand capable of supporting the fish tank as well as the water to be contained therein.

The base cabinet stand houses, a main shut-off valve (48) a clean out trap (49), a filter tank and holding tank assembly (51), a water pump (52) and an electrical connection box (56).

Figure 24:
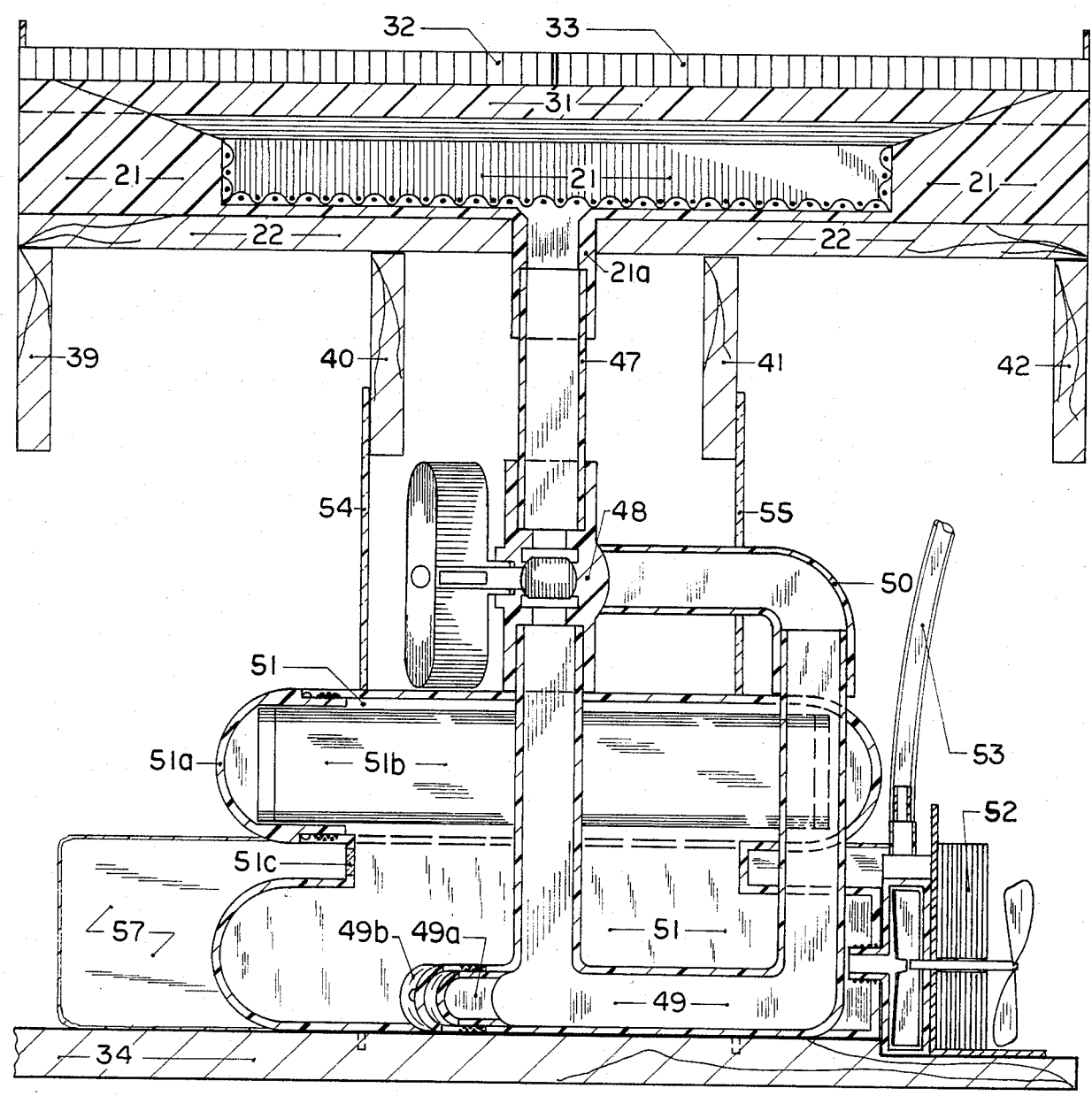
FIG. 24 is an enlarged sectional view of the filtering system.

The main shut-off valve (48) shown in FIG. 24, (made by The R & G Sloane Manufaturing Co., Inc. of Cleveland, Ohio), is formed of molded PVC plastic and contains a CPVC ball/stem with viton stem seals and teflon seats. This shut-off valve (48), which contains ¾ inch nominal socket fittings at its top and bottom ends, is manually operated to allow or restrict the flow of water.

The main shut-off valve (48) is connected to the drain outlet of the funnelform bottom (21a) by a section of ¾ inch nominal CPVC pipe (47) as shown in FIG. 24.

The top and bottom ends of this removable section of pipe (47) fit tightly inside the bottom and top socket fittings of the drain (21a) and the main shut-off valve

[48]respectively, forming a water tight connection at each end.

The clean out trap (49), formed of a "U" shaped ¾ inch nominal CPVC pipe, as shown in FIG. 24, has an access port (49a) located at the front end of its horizontal section. This ¾ inch nominal male threaded cleanout port (49a), can be sealed with a removable end cap (49b) or attached to a garden hose as a means by which to drain the entire system.

The top front end of the cleanout trap (49) is sealed inslide the bottom socket fitting of the main shut-off valve (48) and the top back end of the cleanout trap (49) is connected to the inlet means of the filter tank (51), as shown in FIG. 24.

The filter and holding tanks (51), each formed of 2 inch nominal CPVC pipe material, contain a ¼ inch wide by 6 inch long slotted opening.

These openings are joined by a ½ inch high outer casing of CPVC pipe material, which is molded to the outer surface of each tank and contains a clear plastic level indicator (51c) as shown in FIG. 24.

The filter tank (51), formed with a ¾ inch nominal port at the center of its top side, shown in FIG. 15, is connected to the cleanout trap (49) by a section of ¾ inch nominal CPVC pipe (50).

This pipe (50), formed with a 90 degree socket fitting at each end, fits tightly over each port, forming a water tight connection at each end.

The filter tank (50), containing 2 inch nominal female pipe threads and a removable fiber housing (51b), shown in FIG. 24, is sealed by a 2 inch nominal male pipe threaded end cap (51a) containing an "O" ring, to ensure a water tight seal therein.

The holding tank (51) contains a ½ inch nominal female pipe threaded discharge port, located in the center of the back side end cap.

This port fits tightly around the ½ inch nominal male pipe threaded intake port of the water pump (52), as shown in FIG. 24, forming a water tight connection therein.

The filter and holding tank assembly (51) is supported by two rectangular shaped panels (54 and 55), shown in FIG. 24, that extend vertically between the flat base (22) and the upper beams (40 and 41) of the interior support structure.

These panels (54 and 55) formed of ⅛ inch thick clear plastic, contain openings in which to insert and stabilize the tank assembly (51).

The water pump (52) shown, (made by The Little Giant Pump Co. of Oklahoma City, Ok.), is comprised of a nylon pumping head, with male pipe threaded intake and discharge ports.

This pump (52), shown in FIG. 24, which is adapted to pump water upwards 36 inches high at a rate of 85 GPH to 110 GPH, is powered by a fan cooled motor, with a stainless steel motor shaft and an aluminum mounting bracket.

The connection box (56), composed of durable molded plastic, is mounted on the lower back wall (45) of the base cabinet stand as shown in FIG. 15 and contains all power and control wiring to the water pump (52).

Figure 22:
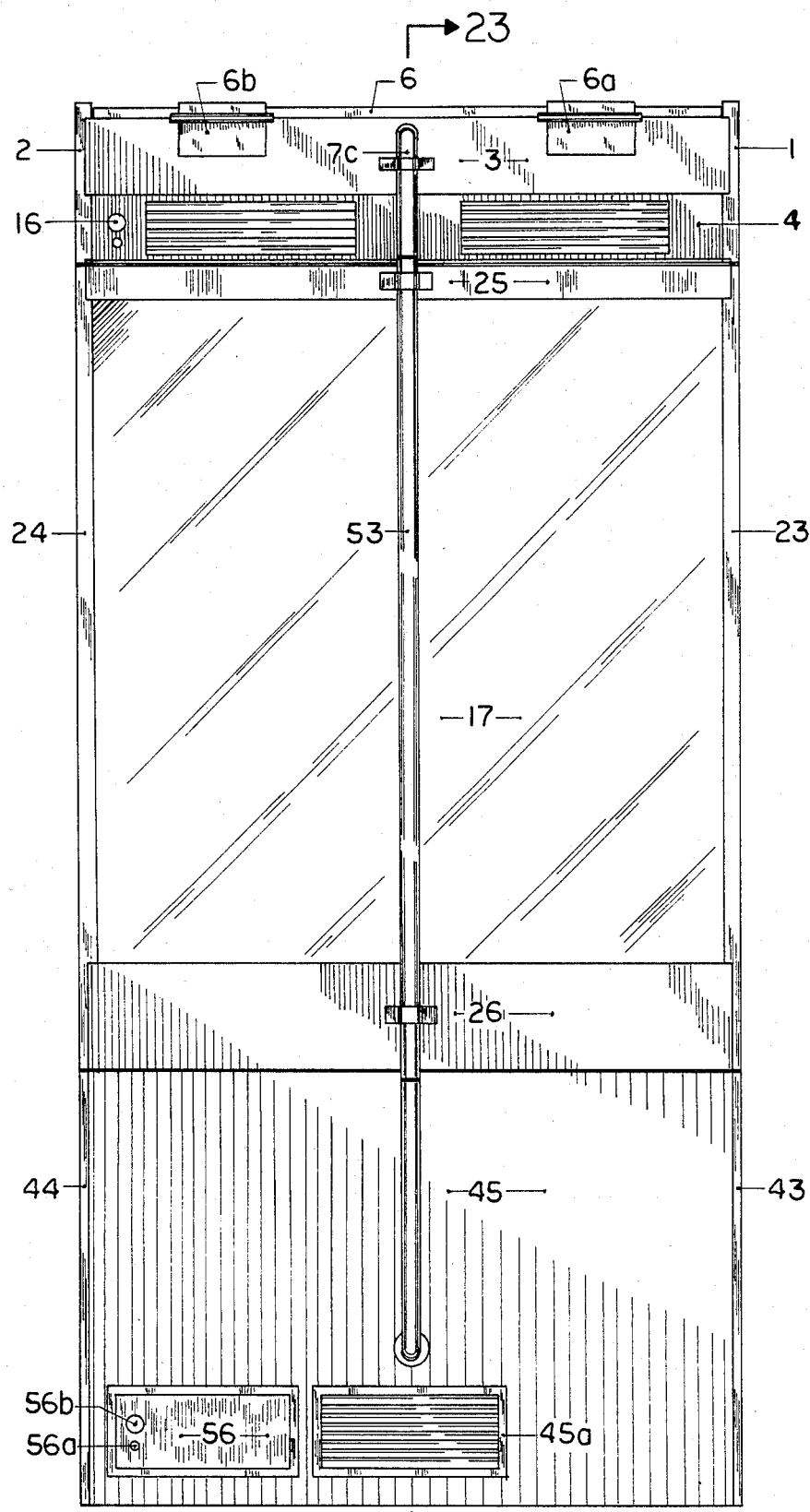
FIG. 22 is a rear elevation of the three preferred embodiments when assembled.

The rear panel of the connection box (56), shown in FIG. 22, contains a grounded AC power cord (56a) and a female connector (56b), in which to insert a male connector located on the end of the insulated electrical cable (16).

The base cabinet stand contains a protective liner (57), which is situated along the top surface of the flat base (34).

Figure 23:
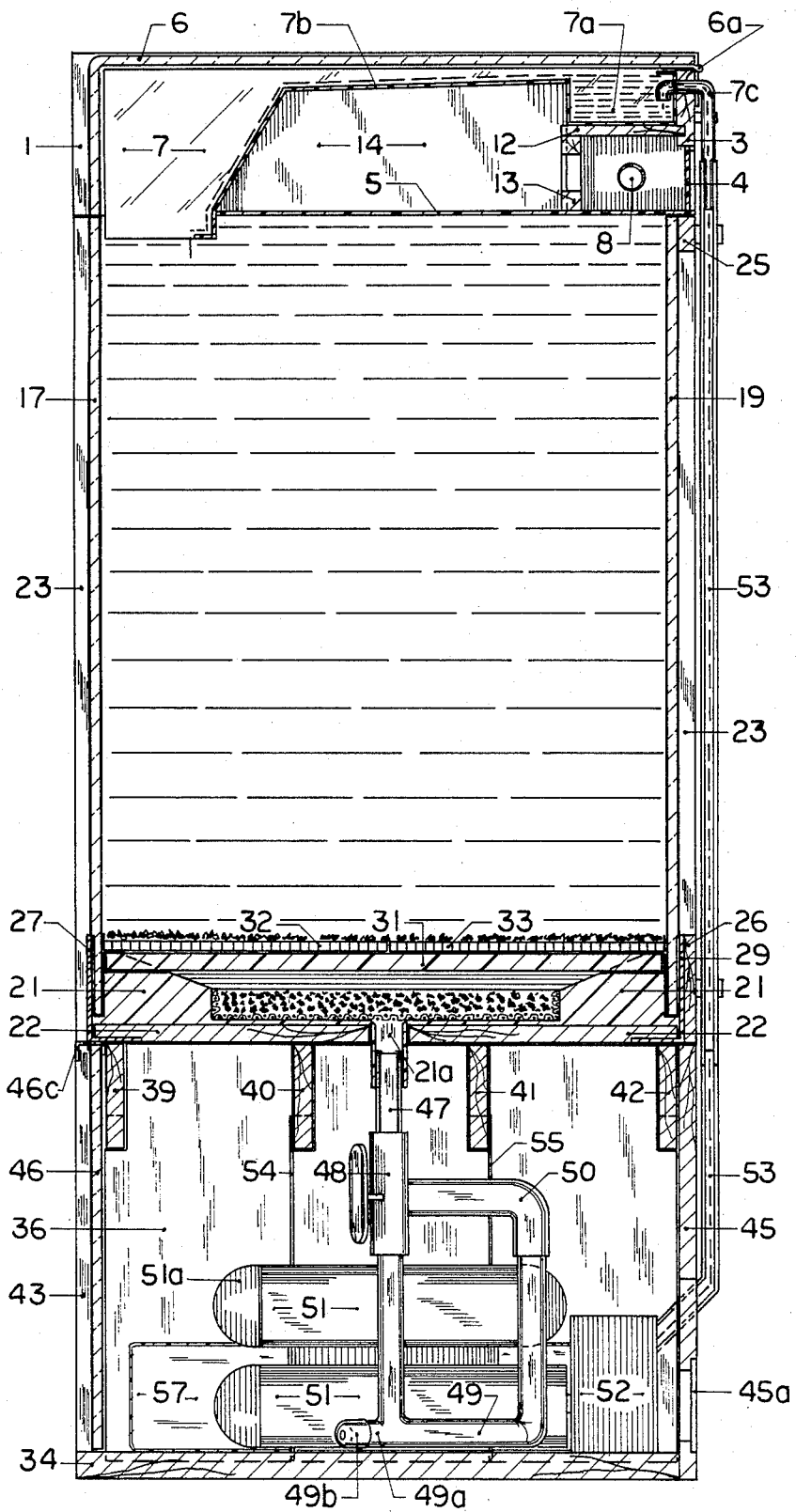
FIG. 23 is a sectional view of the three preferred embodiments taken alnog lines 23—23 of FIG. 22.

This liner (57), composed of thin flexible plastic, forms a catch basin which provides a protective barrier for the water pump (52), as shown in FIG. 23.

For assembly purposes, the top side edges of the base cabinet stand contain two ¼ inch diameter by 1 inch long metal pegs (43a, 43b, 44a and 44b), which are centered 3 inches from the front and back edges of each side wall (43 and 44) with the pegs being embeded ½ inch deep.

METHOD OF ASSEMBLY

The base cabinet stand, should be placed on a flat level surface, with its front (46) and right (44) sides being accessible.

The bottom end of the removable section of pipe (47), should be placed inside the top socket fitting of the main shut-off valve (48).

The fish tank, should be positioned directly over the base cabinet stand, with the top end of the removable section of pipe (47), inside the bottom socket fitting of the drain (21a).

The ¼ inch diameter by ½ inch deep holes of the fish tank should then be joined with the pegs (43a, 43b, 44a and 44b) of the base cabinet stand.

The encased cover, is positioned directly on top of the fish tank, by joining its ¼ inch diameter by ½ inch deep holes, with the top mounted pegs (23a, 23b, 24a and 24b) of the fish tank.

The insulated cable (16) from the encased cover should be connected to the lower rear panel (56b) of the connection box (56) and the discharge port of the water pump (52) will be connected to the inlet pipe (7c) of the water compartment (7a) by a section of ½ inch diameter flexible tubing (53) shown in FIG. 22.

Figure 21:
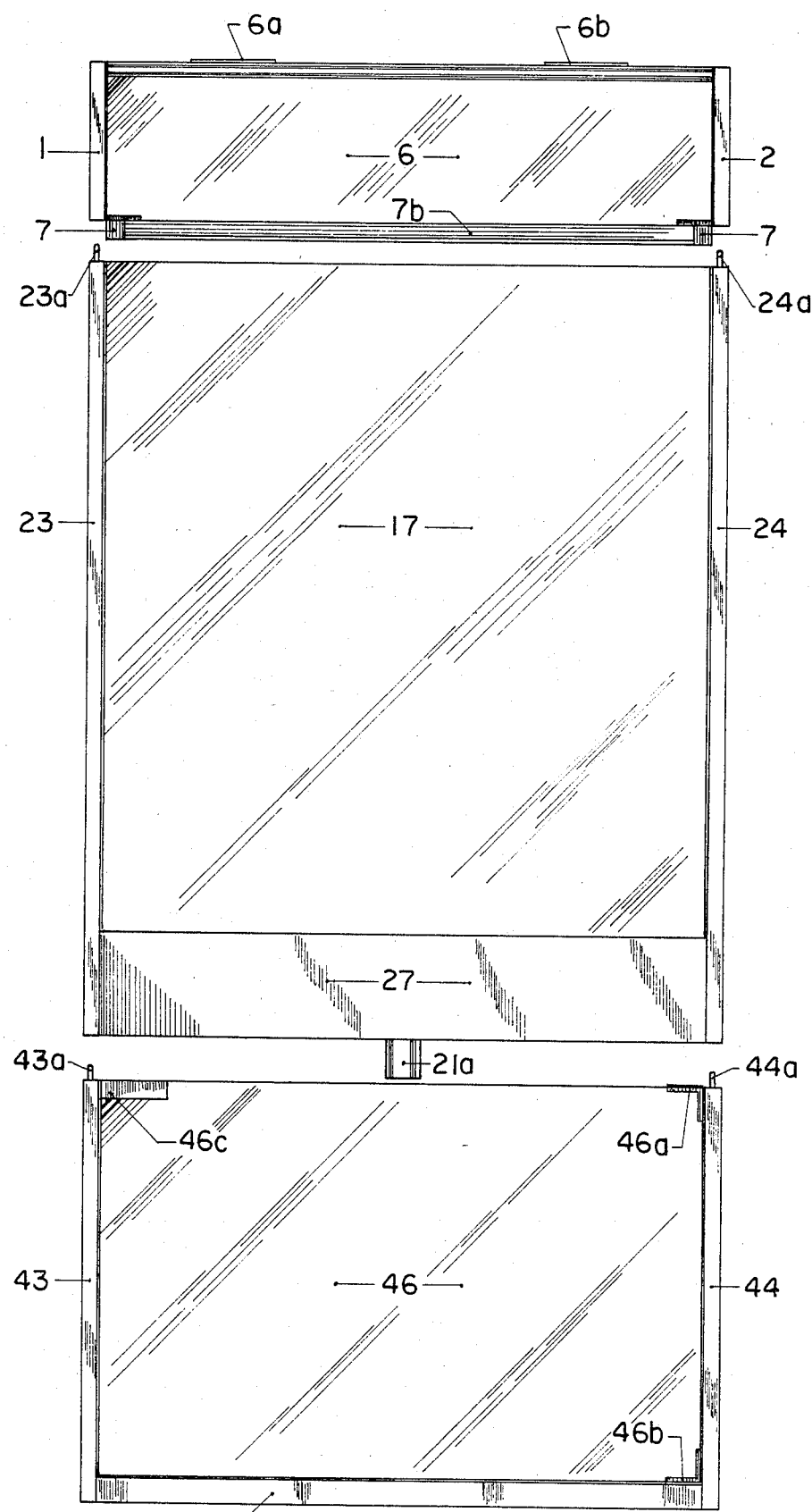
FIG. 21 is a front elevation of the three preferred embodiments and their method of assembly.

This method of assembly, shown in FIG. 21, will allow the precise alignment of each embodiment, in forming one continuous tow of tinted glass and prefinished particle board, as shown in FIG. 1.

PERIODIC MAINTENANCE

The gravity filter system aquarium will virtually eliminate the time consuming task of cleaning the entire tank, by filtering aquarium water just below the gravel where organic waste and other impurities accumulate, thereby making the cleaning and changing of filter medium a simple process.

To clean or change the filter fiber in the filter tank (51), simply:
1. Turn the main shut-off valve (48) to the closed position.
2. Activate the water pump (52) by depressing the switch labeled pump (located in the control panel (2a) on the right side of the cover encasement), until the water level inside the filter tank (51) reaches the safety line (51c).
3. Remove the end cap (51a) and fiber housing (51b) from the filter tank (51).
4. Clean or replace the filter fiber inside the filter housing (51b) before returning it to the filter tank (51) and resealing the end cap (51a).
5. Return the main shut-off valve (48) to the open position.

The detailed descriptions of the three preferred embodiments and their assembly, is a preferred representation of the present invention and shall not impose limitations on variations or modifications that conform to the exclusive property of privilege set forth in the following claims.

What I claim is:

1. An aquarium system wherein unclarified water is gravity filtered, as well as aerated and heated while creating a waterfall effect therein, said system being regulated by a programmable timer, said system comprising;
   a. an open topped fish tank, said tank having glass sides that extend vertically from a funnelform bottom, said funnelform bottom being composed of a flat base and an interior structure that slopes downwards towards a trench and a drain outlet means;
   b. a base cabinet stand with sides that extend vertically from a flat base, said stand having a glass door, said stand further being reinforced by an interior beam and panel structure;
   c. an encased cover having raised side walls, a lift up top and a flat bottom said cover extending horizontally over the open topped fish tank. said bottom extending horizontally between said side walls and substantially over the open topped fish tank, said cover further having an open interior comprising a water compartment and guide tray, said interior further comprising access means to th fish tank;
   d. a water compartment and guide tray having raised side walls and a horizontal overflow edge said water compartment comprising inlet means for receiving and collecting water, said water compartment further extending slightly outward from said inlet means and terminating along said horizontal edge, said edge comprising outlet means, so that water collected in said water compartment spills over said horizontal edge, said horizontal edge further comprising inlet means for said guide tray, said guide tray comprising a sloping horizontal surface extending between said side walls, said guide tray further extending substantially outward over the open topped fish tank and terminating in a downward sloped surface, said sloping surface being in communication with the open topped fish tank so that water passes over said sloping surface and said downward sloped surface, generating a continuous curtain of water as it is returned to the tank, said guide tray further comprising a means by which to achieve a natural exchange of heat and air;
   e. gravity filter means, said filter means being composed of two removable gravel support grating trays and a funnelform bottom inside the fish tank, along with a main shut-off means, a clean out means, a filter tank, a holding tank and a water pump means housed within the base cabinet stand;
   f. a programmable timer, said timer being housed within the encased cover, said timer further being adapted to regulate daily on/off functions of the water pump means.

2. An aquarium system as defined in claim 1, wherein the fish tank is composed of tinted transparent glass, said glass acquiring the appearance of reflective glass with the absence of light on one side, said fish tank further being open at the top and bottom sides.

3. An aquarium system as defined in claim 1, wherein the funnelform bottom has inlet means in the form of an open top side and contains an interior structure that slopes inwards towards a centrally located trench and a bottom side drain outlet means, said bottom side drain outlet means having a wide flange top side inlet containing a filter screen and a socket fitting bottom side outlet, said funnelform bottom futher having a slotted opening along top side edges in which to insert and seal glass edges of the fish tank.

4. An aquarium system as defined in claim 1, wherein the two removable gravel support grating trays are supported by a removable center support beam as well as by the top edges of the funnelform bottom, said grating trays having raised side walls and grid pattern bottoms, said grating trays further having inlet means along their top sides and outlet means along their bottom sides.

5. An aquarium system as defined in claim 1, wherein the filter tank has a top side inlet means and a bottom side outlet means said filter tank containing a removable end cap and fiber housing.

6. An aquarium system as defined in claim 1, wherein the holding tank has a top side inlet means and a back side outlet means, said top side inlet means of the holding tank being in communication with the filter tank above.

7. An aquarium system as defined in claim 1, wherein the water pump means, being mounted at the bottom of the base cabinet stand, has a front side inlet means and a top side outlet means, said front side inlet means of the water pump means being in communication with the holding tank, said top side outlet means of the water pump means being connected by plastic tubing, to the water compartment housed within the cover encasement.

8. An aquarium system as defined in claim 1, wherein the glass door of the base cabinet stand is composed of tinted transparent glass, said glass acquiring the appearance of reflective glass with the absence of light on one side, said glass door further to be hinged to one side of the base cabinet stand.

9. An aquarium system as defined in claim 1, wherein an interior support structure of the base cabinet stand is composed of a network of beams and panels, said panels extending vertically from a flat base to the top a of the stand and front wall to the a back wall of the stand, said panels further having slots along their top edges in which to insert support beams, said beams span from side to side along the open top of the base cabinet stand, said interior support structure comprising a means of support for the fish tank as well as the water to be contained therein.

10. An aquarium system as defined in claim 1, wherein the main shut-off means has socket fitting inlet and outlet means situated at the top and bottom ends respectively, said shut-off means further having a manually operated ball valve to allow or restrict the flow of water therein.

11. An aquarium system as defined in claim 1, wherein the drain outlet means of the funnelform bottom contains a bottom side socket fitting outlet means and the main shut-off means has a top side inlet and a bottom side outlet socket fitting means, said bottom side drain outlet means being connected to the top side socket fitting inlet means of the main shut-off means by a removable section of high pressure pipe, said pipe to fit tightly inside each socket forming a water tight connection at each end.

12. An aquarium system as defined in claim 1, wherein the clean out means is composed of a "U" shaped high pressure plastic pipe, U-shaped pipe having inlet and oulet means at the top ends, said inlet means to be sealed water tight inside the main shut-off means, said clean out means further having a threaded access port on which to tighten a removable end cap or a garden hose, said port to function as a cleanout port as well as a main outlet means for draining the entire system.

13. An aquarium system as defined in claim 1, wherein the clean out means, is connected to the filter tank, by a section of high pressure pipe, said pipe having 90 degree socket fittings at each end that fit tightly on the clean out means and the filter tank, forming a water tight connection at each end.

14. An aquarium system as defined in claim 1, wherein the water pump means has been adapted to pump water from the holding tank upwards through flexible tubing into the water compartment housed within the encased cover, said water pump means further being adapted to pump water at a rate of speed sufficient enough to create a continuous flowing curtain of water along the guide tray.

15. An aquarium system as defined in claim 1, wherein the filter tank and the holding tank are supported by panels, said panels extending vertically frome the flat base of the base cabinet stand, to the upper supports of the interior beam and panel structure, said panels further having openings in which to insert and stabilize both tanks.

16. An aquarium system as defined in claim 1, wherein the base cabinet stand contains a protective liner, said liner being composed of a thin flexible plastic material, is situated about the flat base of the stand forming a catch basin, said liner further providing a protective barrier for the water pump means.

17. An aquarium system as defined in claim 1, wherein the base cabinet stand contains a connection box, said connection box being composed of thin plastic, is located at the lower back end of the stand, said connection box further containing all power and control wiring of the water pump means.

18. An aquarium system as defined in claim 1, wherein the lift up top is composed of tinted transparent glass or plexiglas, said glass aquiring the appearance of reflective glass with the absence of light on one side, said glass further to contain a 90 degree bend at a distance from a front edge of the encased cover which is equal to that between the top and bottom edges of the encased cover.

19. An aquarium system as defined in claim 1, wherein the water compartment is comprised of a back wall, a front wall and translucent side walls, all extending vertically from a flat bottom forming a water tight containment therein, said water compartment having inlet means for receiving water and outlet means for returning water to the fish tank, said inlet means consisting of an intake pipe through the back wall, which is connected to the water pump means by plastic tubing, said outlet means comprised of the top front edge of the water compartment, having a top elevation slightly lower than that of a back wall and side walls, in conjunction with the guide tray, said guide tray being bent horizontally at two points forming three increasingly accelerative slopes, said guide tray further having a thin splash plate along the lower edg at a point slightly below and parallel to the flat base of the encased cover.

20. An aquarium system as defined in claim 1 wherein the encased cover contains interior supports, said supports to span side to side below the flat bottom of the water compartment and below the bottom of the guide tray from its upper back edge to its lower front edge.

21. An aquarium system as defined in claim 1 wherein the encased cover contains a fluorescent light means, said light means being adapted to fit below the flat bottom of the water compartment, is ventilated by-way-of openings in the flat base and lower back wall of the encased cover, said light means to provide lumination for the fish tank as well the encased cover.

22. An aquarium system as defined in claim 1, wherein the encased cover contains an aerator means, said aerator means being mounted so that a discharge port penetrates the flat base of the encased cover, said aerator means further being adapted to pump air downwards through small flexible tubing into the fish tank, where it will be distributed in the form of air bubbles throughout the water therein.

23. An aquarium system as defined in claim 1, wherein the programmable timer is located on the right side of the encased cover, said timer being adapted to regulate the on/off functions of the water pump means, said timer further capable of being manually programed to initiate up to four on/off functions daily.

24. An aquarium system as defined in claim 1, wherein the encased cover contains an electrical switch box, said switch box being composed of thin plastic, is located on the right side of the cover encasement, said switch box further contains all power and control wiring as well as activator switches and is in communication with a connection box, located in the base cabinet stand by an insulated electrical cable.

* * * * *